US009953990B1

(12) United States Patent
Horch et al.

(10) Patent No.: US 9,953,990 B1
(45) Date of Patent: Apr. 24, 2018

(54) ONE-TIME PROGRAMMABLE MEMORY USING RUPTURING OF GATE INSULATION

(71) Applicant: Synopsys, Inc., Mountain View, CA (US)

(72) Inventors: Andrew E. Horch, Seattle, WA (US); Victor Moroz, Saratoga, CA (US); Jamil Kawa, Campbell, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/666,445

(22) Filed: Aug. 1, 2017

(51) Int. Cl.
*H01L 27/112* (2006.01)
*H01L 23/525* (2006.01)
*H01L 23/528* (2006.01)
*H01L 29/78* (2006.01)
*H01L 23/522* (2006.01)
*H01L 29/66* (2006.01)
*H01L 21/28* (2006.01)
*H01L 21/768* (2006.01)
*G06F 17/50* (2006.01)
*H01L 29/06* (2006.01)

(52) U.S. Cl.
CPC .... *H01L 27/11206* (2013.01); *G06F 17/5068* (2013.01); *H01L 21/28008* (2013.01); *H01L 21/76895* (2013.01); *H01L 23/5226* (2013.01); *H01L 23/5252* (2013.01); *H01L 23/5283* (2013.01); *H01L 29/0649* (2013.01); *H01L 29/66795* (2013.01); *H01L 29/7851* (2013.01)

(58) Field of Classification Search
CPC ......... H01L 27/11206; H01L 21/28008; H01L 21/76895; H01L 23/5226; H01L 23/5252; H01L 23/5283; H01L 29/0649; H01L 29/66795; H01L 29/7851; G06F 17/5068
See application file for complete search history.

(56) References Cited

U.S. PATENT DOCUMENTS

| | | | |
|---|---|---|---|
| 2009/0294903 A1* | 12/2009 | Shih | ............. H01L 23/5252 257/530 |
| 2011/0042735 A1* | 2/2011 | Ishigaki | ............. H01L 27/112 257/314 |
| 2011/0254122 A1* | 10/2011 | Noda | ............. H01L 23/5252 257/530 |

OTHER PUBLICATIONS

Degraeve, R. et al., "Analytical Model for Failure Rate Prediction Due to Anomalous Charge Loss of Flash Memories," IEDM 01-699, IEEE, 2001, pp. 32.1.1-32.1.4.
Chen, Y-Z. et al., "Multilevel Anti-Fuse Cells by Progressive Rupturing of the High-κ Gate Dielectric in FinFET Technologies," IEEE Electron Device Letters, Sep. 2016, pp. 1120-1122, vol. 37, No. 9.

* cited by examiner

*Primary Examiner* — Karen Kusumakar
(74) *Attorney, Agent, or Firm* — Fenwick & West LLP

(57) ABSTRACT

Embodiments relate to an anti-fuse device with a transistor. The transistor may be a FinFET. The anti-fuse device includes a first electrode, an insulating layer, and a second electrode. The gate of the transistor may be formed in a same layer as the first electrode. The gate insulating layer on the gate of the transistor may be formed in a same layer as the insulating layer. The second electrode may be formed in a same layer as a local interconnect or a via and overlap the first electrode vertically over the insulating layer.

18 Claims, 10 Drawing Sheets

US 9,953,990 B1

ONE-TIME PROGRAMMABLE MEMORY USING RUPTURING OF GATE INSULATION

BACKGROUND

1. Field of Art

The disclosure generally relates to the field of non-volatile memory cells, particularly one-time programmable (OTP) memory cells.

2. Description of the Related Art

An OTP memory cell may be implemented using anti-fuse based memory in which an insulating layer between two electrodes (e.g., two conductive layers) is ruptured to create a conductive path between the first electrode and the second electrode. The default state of the anti-fuse is open or non-conductive (e.g., "0"), and data is written to a memory cell by rupturing the insulating layer and forming a filament to make the anti-fuse a short (e.g., "1").

An anti-fuse based memory can be implemented using a transistor structure. A transistor structure may include a source and a drain, a channel between the source and drain, a gate dielectric formed on the channel between the source and the drain, and a gate formed on the gate dielectric. An anti-fuse may be formed using the gate dielectric as an insulating layer between a first electrode being the source and/or the drain and/or channel and a second electrode being the gate. The insulating layer of the anti-fuse may be ruptured by applying a high voltage across the gate dielectric. For example, the high voltage may be applied to the second electrode being the gate and the first electrode being the source and/or the drain and/or channel may be grounded. The high voltage across the gate dielectric may rupture or break down the gate dielectric and create a conductive path between the second electrode and the source or drain or channel and the first electrode. The conductive path may be a filament that is formed in the gate dielectric.

One disadvantage for using the gate dielectric as the insulating layer of the anti-fuse is that soft breakdown of the insulating layer may occur instead of rupture of the insulating layer. The gate oxide used in transistor structures are typically thin silicon oxide ($SiO_2$) layer or a high-k dielectric layer to improve transistor performance by increasing capacitive coupling of the gate to the channel of the transistor. The thin silicon oxide layer or the high-k dielectric layer may undergo soft breakdown when a high voltage is applied across the thin silicon oxide layer or the high-k dielectric layer. During soft breakdown of the insulating layer, trapped charges may be formed in the insulating layer which may form a conduction path through the insulating layer. However, the insulating layer is not ruptured and a filament may not be formed in the insulating layer. When the anti-fuse of the OTP memory cell is read, electrons may travel between the first electrode (e.g., source and/or drain) and the second electrode (e.g., gate) via trap assisted tunneling using the trapped charges formed during the soft breakdown. Thus, the electrons traveling between the first electrode and the second electrode may produce currents that appear like the insulating layer is ruptured. However, the insulating layer may heal over time. For example, the trapped charges may migrate or the insulating layer may anneal such that electrons no longer travel between the first and the second electrode via trap assisted tunneling, which may cause the anti-fuse to switch states. Thus, the anti-fuse may undergo soft breakdown and may first appear to be shorted (e.g., "1") and at a later time the soft breakdown of the insulating layer may heal and the anti-fuse may appear to be open (e.g., "0").

DETAILED DESCRIPTION

Figure 1:
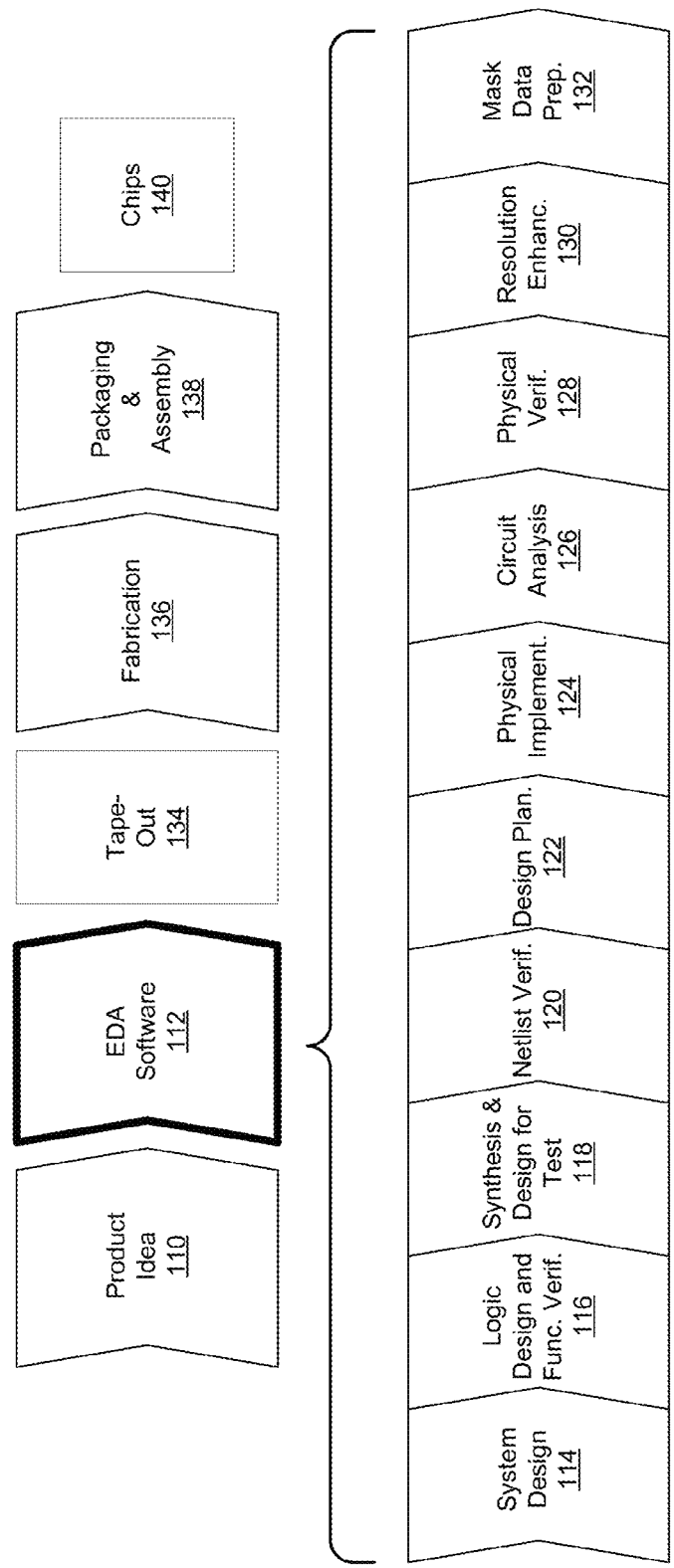
FIG. 1 is a flowchart illustrating various operations for designing and fabricating an integrated circuit (IC), according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. It should be recognized from the following description that alternative embodiments of the structures and methods illustrated herein may be employed without departing from the principles described herein.

The figures use like reference numerals to identify like elements. A letter after a reference numeral, such as "102A," indicates that the text refers specifically to the element having that particular reference numeral. A reference numeral in the text without a following letter, such as "120," refers to any or all of the elements in the figures bearing that reference numeral.

Embodiments relate to a one-time programmable (OTP) memory cell including an anti-fuse device and a transistor. The anti-fuse device includes a first electrode made of a gate layer, an insulating layer made of a gate insulating layer, and a second electrode made of a local interconnect layer. The second electrode overlaps vertically with the first electrode over the insulating layer. A portion of the insulating layer is ruptured between the first electrode and the second electrode to form a current path when a voltage above a threshold is applied across the insulating layer. As the insulating layer of the anti-fuse device is made of a gate insulating layer that covers the gate, the gate insulating layer is thicker and less likely to experience a soft breakdown than an insulating layer made of a gate dielectric layer that the gate is formed over.

Overview of EDA Design Flow

Figure (FIG. 1 is a flowchart illustrating various operations for designing and fabricating an integrated circuit, according to one embodiment. The design process 100 starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the integrated circuit design. Packaging and assembly processes 138 are performed, which result in finished chips 140.

Figure 2:
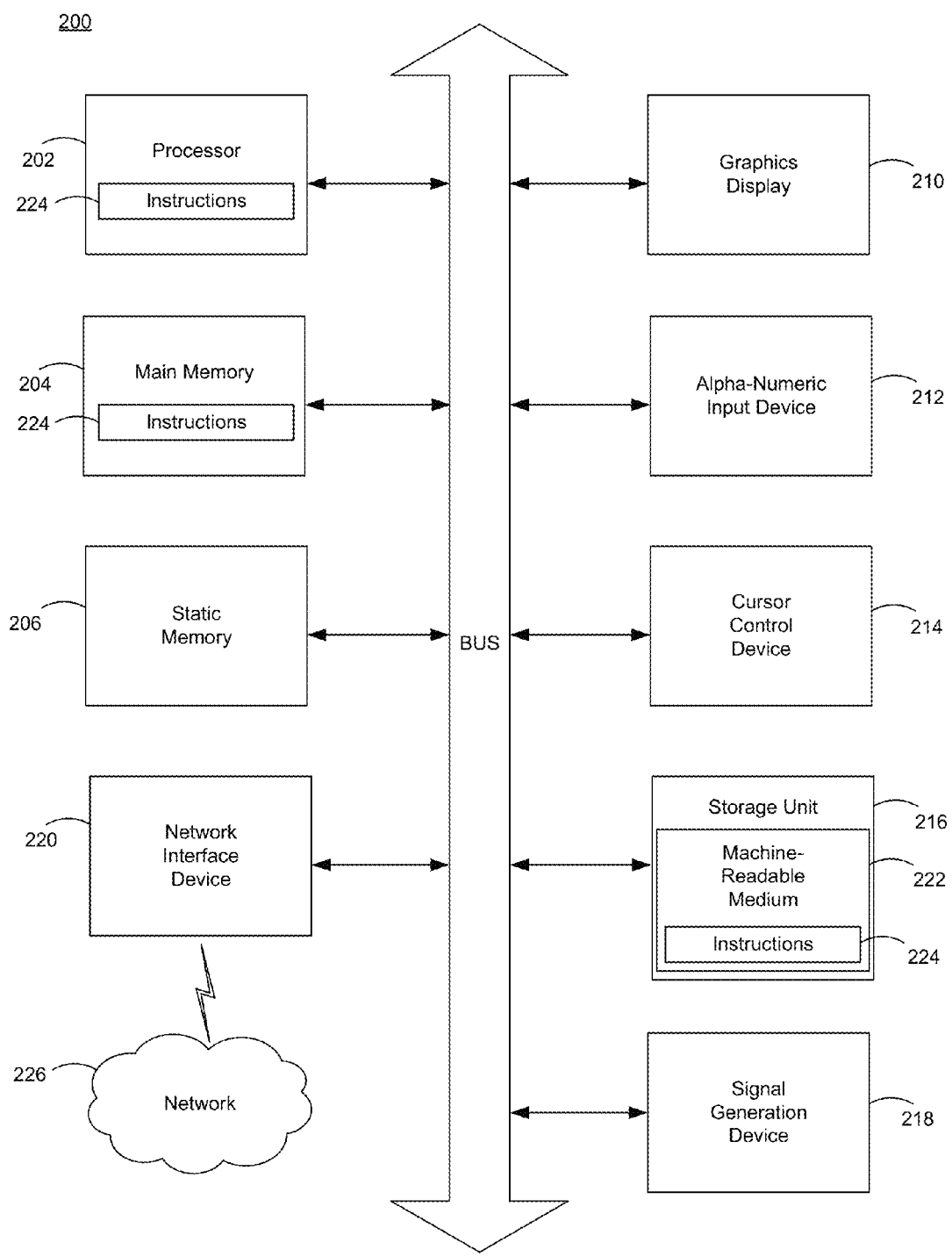
FIG. 2 is a high-level block diagram illustrating an example of a computing device for performing custom designing of an IC, according to one embodiment.

The EDA software 112 may be implemented in one or more computing devices such as the computing device 200 of FIG. 2. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: Custom Compiler®, the Astro® and IC Compiler® products. Embodiments described herein relate primarily to the physical implementation 124.

During circuit analysis 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus® AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products. Formal verification may be performed at the stage of logic design and functional verification 116. Low power design specification is typically processed during stages synthesis and design for test 118 or netlist verification 120.

Embodiments of the present disclosure can be used during one or more of the above-described stages. Specifically, embodiments may be used for the processes of design planning 122 and physical implementation 124.

Computing Device Overview

FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and may be data repositories in the form of solid-state memories, optical media, and magnetic media.

Example FET Process

Field Effect Transistor (FET) process technology include steps for making a transistor (FET) as well as steps for making electrical connections of the FET to circuit elements (e.g., source, drain, and gates of the same or other FETs, capacitors, resistors, etc.). The FET process technology may be used to make a Fin Field Effect Transistor (FinFET) and include process steps for making a fin. The FET process technology for making a FinFET may be called a FinFET process technology. The processes described below are merely illustrative, and the various process steps provided below are examples.

The process steps for making a FinFET may include forming a fin, isolating the fin, forming a gate stack (e.g., gate dielectric and gate), and forming a source and a drain. To form the fin, a semiconductor substrate (e.g., silicon) may be coated with a hard mask which is subsequently patterned via photolithography and etching. The patterned hard mask may be used as a mask for selectively etching the semiconductor substrate to form the fin. The semiconductor substrate may be etched using an anisotropic etch (e.g., preferentially etching the semiconductor in a direction perpendicular to the substrate surface). In one aspect, an array of fins is formed and some fins or portions of fins are selectively removed.

To isolate the fin, an insulating layer may be deposited to cover the fin completely. The insulating layer may be planarized using chemical mechanical polishing (CMP) down to the layer of the fin covered with the hard mask. The insulating layer may then be etched such that a height of the fin is revealed (e.g., semiconductor channel), and the remaining insulating layer may form a lateral isolation of the fin to neighboring fins. The insulating layer may be an oxide layer and the remaining insulating layer forming the lateral isolation may be referred to as shallow trench isolation (STI) oxide. Then, the hard mask covering the top of the fins may be removed.

To form the gate stack, a gate-first or a gate-last process may be used. The gate stack includes a gate dielectric and a gate. A first type of gate stack may include a thin silicon oxide as the gate dielectric and a polysilicon (poly) as the gate. A second type of gate stack may include a high-k dielectric as the gate dielectric and a metal as the gate. The first type of gate stack including silicon oxide and poly is typically made with a gate-first process in which the gate is formed before the source and drain are formed. The second type of gate stack including the high-k dielectric and the metal may not be compatible with the process steps for forming the source and drain. Thus, the second type of gate stack including the high-k dielectric and the metal may use a gate-last process in which the gate is formed after the source and drain are formed.

In a gate-first process, a gate stack is formed before the source and the drain is formed. For example, a first type of gate stack including a thin silicon oxide and a poly may be formed or patterned over the fins. The first type of gate stack may be used as a mask during an ion implantation or diffusion step for doping regions of the fin not masked by the gate stack, followed by a high temperature anneal to form the source and the drain. In the gate-first process a sidewall dielectric may be added after the formation of the gate to further isolate the neighboring gates.

In a gate-last process, the final gate stack is formed after the formation of the source and the drain. First, a sacrificial gate stack may be formed or patterned over the fin. For example, the sacrificial gate stack may include a $SiO_2$ dielectric and a poly silicon gate. The sacrificial gate stack may be used as a mask during an ion implantation or diffusion step for doping regions of the fin not masked by the sacrificial gate stack, followed by a high temperature anneal to form the source and the drain. Once the source and drain are formed, an insulating layer may be formed over the sacrificial gate and planarized using CMP. The sacrificial gate stack may then be removed and the remaining insulating layer may be referred to as a gate spacer. A gate stack (e.g., replacement gate stack) may be formed in the region previously occupied by the sacrificial gate stack. For example, a second type of gate stack including a high-k dielectric and a metal may be formed over the fin in the region previously occupied by the sacrificial gate stack. The gate stack may be formed by depositing a high-k dielectric layer over the fin and a gate metal layer over the fin and gate spacer. The gate metal layer may be planarized with CMP down to the height of the gate spacer layer. The remaining gate metal layer covering the gate dielectric and the fin may be referred to as the gate.

Once the FinFET has been formed, the process steps for making electrical connections of the FinFET to other circuit elements may include electrically insulating the FinFET, forming local interconnects, electrically insulating the local interconnects, and patterning a first metal layer.

To electrically insulate the FinFET, an insulating layer may be formed over the FinFET. The insulating layer may include a gate insulating layer (e.g., an etch stop layer such as SiN, SiON, $Si_3N_4$, SiNC, SiONC, $Si_3N_4$) and a first insulating layer such as $SiO_2$, SiO, tetraethoxysilane (TEOS), SiOF. The first insulating layer may be planarized using CMP.

Local interconnects are typically used in FinFET processes. A local interconnect is a conductive layer with higher resistance than other metal layers formed in the FinFET process (e.g., first metal layer). Since the resistance is higher than the other metal layers, the local interconnect is only used for "local" (short distance) connections. The local interconnect used in FinFET processes is a typically a line with one dimension set to a fixed length and the other dimension extending an arbitrary distance. In contrast, a contact or a via has lengths in both dimensions that are fixed. A FinFET process uses local interconnects for a few reasons. In some processes, adjacent fins do not touch so local interconnects are used to short all the fins in the source/drain region of multi-finger devices. Also, local interconnects can lower a source/drain resistance by wrapping around the fin to make better contact to the source or drain of a fin. There are two types of local interconnects, one to contact the diffusion layer (fins) and one to contact to the gate layer. Each local interconnect can be optimized for the different depths of the diffusion and the gate in the FinFET structure (e.g., the top of the gate is higher than the top of the fin). The local interconnect to the diffusion can be self-aligned to the gate reducing source/drain resistance. In typical FinFET processes a via is used to connect the first layer of metal to the local interconnect or interconnects.

In complementary metal-oxide-semiconductor (CMOS) technologies, the gate runs perpendicular to the diffusion (fins). In FinFET processes, to simplify the manufacturing process, it is typical for all the fins to be aligned in one direction and all the gates to be aligned perpendicular to the fins. The various local interconnects are aligned according to the type of local interconnect (e.g., what they are connecting to). Since the gate local interconnect is used to short gates together, it runs perpendicular to the gate electrode. Since diffusion interconnects are used to short diffusion (fins) together, the diffusion interconnect runs perpendicular to the fins.

To electrically insulate the interconnects, a second insulating layer may be formed on the first insulating layer and the interconnects. Vias may be formed in the second insulating layer. For example, holes may be formed in the second insulating layer via photolithography and etching. The holes may be filled with a metal layer. The metal layer may then be planarized with CMP to the surface of the second insulating layer.

To pattern a first metal layer, a first metal layer may be formed on the second insulating layer and patterned with photolithography and etching. Vias made in the second insulating layer may connect local interconnects to the first metal layer. As the local interconnects also contact the diffusion layer and gate layer, electrical connections of the FinFET to other circuit elements may be made.

Example OTP Memory Cells

A one-time programmable (OTP) memory cell may include an anti-fuse device and a transistor. The anti-fuse device can be fabricated concurrently with the transistor of the OTP memory cell. Thus, a first electrode of the anti-fuse device may be made of a gate layer, an insulating layer made of a gate insulating layer, and a second electrode made of a local interconnect layer. In one embodiment, the transistor of the OTP memory cell is a FinFET. An OTP memory cell may use a different transistor structure (e.g., no fins or multiple fins) and process for fabricating the OTP memory cell.

The OTP bitcell may consist of two devices, a fuse device and a select device. The select device is typically a transistor that is used in an array to isolate a specific row of anti-fuses for reading or programming. The select device for the anti-fuse device may be a FinFET and include a semiconductor fin, source, drain, and gate. A source or drain of the FinFET may be connected to the first electrode of the anti-fuse device. In one architecture the anti-fuse device and select device are in series with the second electrode of the anti-fuse device connected to a fuse line. The second electrode is coupled through a dielectric to the first electrode of the anti-fuse device. The first electrode of the anti-fuse device is connected to either the source or drain of the select device. This connection may include both local interconnect and metal. In one embodiment, the first electrode of the anti-fuse is connected to a local interconnect that connects to a gate layer that connects to a first via that connects to a metal layer and in turn is connected to a second via that connects to a local interconnect layer that connects to the source of a FinFET. The select device in the preferred embodiment is a NMOS select device. Another embodiment not shown uses a PMOS select device.

Different operations to the OTP memory cell may be performed by applying different voltages to the first electrode of the anti-fuse device. A write operation to the OTP memory cell may be performed by applying a first voltage (e.g., rupture voltage, 4V) to the second electrode of the anti-fuse device. The gate of the NMOS select device is held at a high voltage to turn the NMOS select device on. The drain of the NMOS select device is held at either 0V to rupture the insulating layer of the anti-fuse device or at a high voltage to inhibit rupturing of the insulating layer of the anti-fuse device.

Figure 3A:
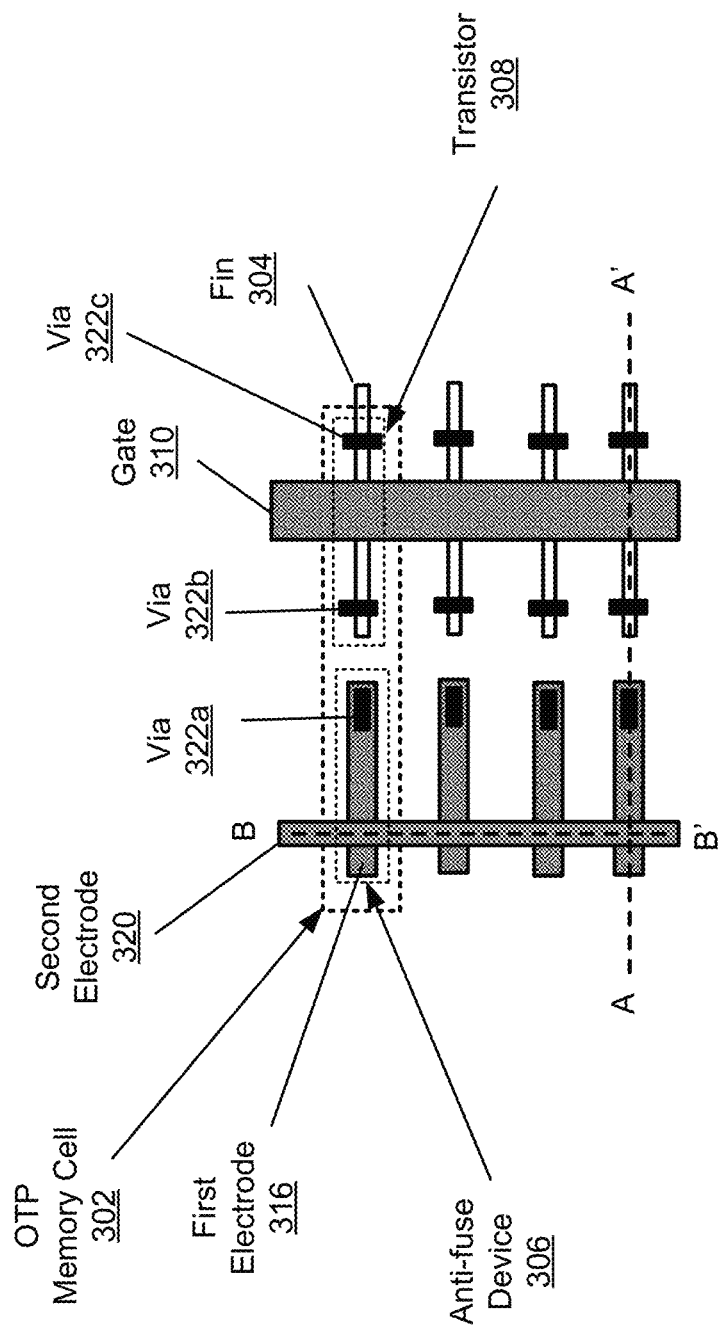
FIG. 3A is a top view of one-time programmable (OTP) memory cells with an electrode of an anti-fuse device formed in a same layer as a local interconnect in a Fin Field Effect Transistor (FinFET) process, according to one embodiment.

FIG. 3A is a top view of one-time programmable (OTP) memory cells with an electrode 320 of an anti-fuse device 306 formed in a same layer as a local interconnect 321*b* using a FinFET process, according to one embodiment. In this embodiment, an OTP memory cell 302 has a second electrode 320 formed using process steps for forming a first type of interconnect 321*b* (e.g., for contacting a diffusion layer and not a gate layer). In a process with separate gate and diffusion local interconnects (e.g., local interconnect to contact a gate layer and local interconnect to contact a diffusion layer), the diffusion local interconnect typically will not short to the gate layer due to a hard mask (e.g., gate insulating layer) on top of the gate. The first electrode 316 is formed in a same gate layer as a gate 310. The second electrode 320 overlaps the first electrode 316 over a gate insulating layer 346 (shown in FIG. 3B) and extends in a direction perpendicular to the first electrode 316. Typically, a first type of interconnect 321*b* does not overlap a gate layer and is formed parallel to the gate 310. However, the OTP memory cell 302 with the second electrode 320 formed using the process steps for forming the first type of interconnect is formed over the first electrode 316 made in a same gate layer as gate 310. Thus, the second electrode 320 formed for contacting a diffusion layer is formed over a gate insulating layer 346 (shown in FIG. 3B) formed over the first electrode 316 that separates the first electrode 316 from the second electrode 320.

The OTP memory cell 302 includes an anti-fuse device 306 and a transistor 308. The anti-fuse device 306 includes a first electrode 316 extending horizontally, a second electrode 320 extending vertically, and an insulating layer (e.g., gate insulating layer 346 shown in FIG. 3B) separating the first electrode 316 and the second electrode 320. The first electrode 316 and the second electrode 320 allow a voltage to be applied across the gate insulating layer 346 of the anti-fuse device 306 to write or read to the anti-fuse device 306 of the OTP memory cell 302. For example, a first voltage may be applied across the gate insulating layer 346 to write to the anti-fuse device 306. A second voltage may be applied across the gate insulating layer 346 for reading the anti-fuse device 306.

The transistor 308 (e.g., FinFET) may be used to write or to read the anti-fuse device 306 of the OTP memory cell 302. The transistor 308 includes a fin 304, a gate 310, and a source and a drain on the fin 304. The FinFET 308 may be made using an example process for fabricating a FinFET device as described previously.

Electrical connections of the FinFET 308 may be made to the anti-fuse device 306 through via 322a, via 322b, and a first metal layer (not shown). Vias 322a, 322b, and 322c are made through a second insulating to a first metal layer (not shown). A first type of local interconnect may connect vias 322b and 322c to a source or a drain of transistor 308. A second type of local interconnect connects vias 322a to the first electrode 316. Although not shown, a first metal layer may be patterned to connect via 322a and via 322b in the first metal layer, thus connecting the first electrode 316 to the drain or the source of transistor 308.

Figure 3B:
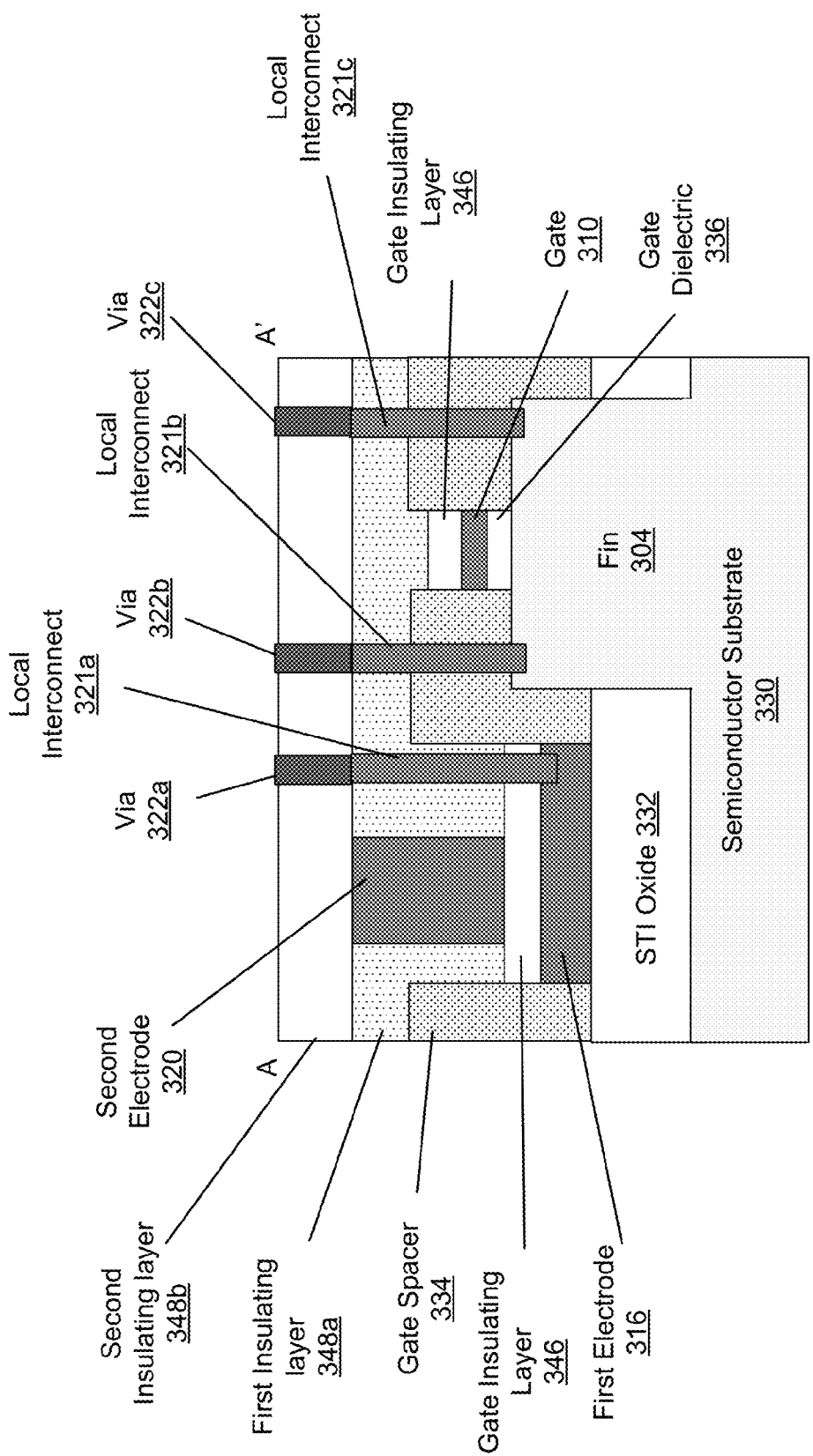
FIG. 3B is a cross sectional view of a single OTP memory cell including an anti-fuse device and transistor taken along line A-A' of FIG. 3A, according to one embodiment.

FIG. 3B is a cross sectional view of the OTP memory cell 302 taken along line A-A' of FIG. 3A, according to one embodiment. In FIG. 3A, an anti-fuse device 306 is shown on the left side and the FinFET 308 is shown on the right side.

The FinFET 308 may include, among other components, semiconductor substrate 330, a fin 304, a shallow trench isolation (STI) oxide 332, gate spacer 334, a gate dielectric 336, a gate 310, a gate insulating layer 346, a first insulating layer 348a, and a second insulating layer 348b. The STI oxide 332 covers the semiconductor substrate 330 and lower portions of the fin 304 to isolate the fin 304. A gate spacer 334 covers portions of the STI oxide 332 and portions of the fin 304. The gate spacer 334 may be formed before or after the formation of the gate 310.

Fabricating OTP Using FinFET Process

An OTP memory cell may be fabricated using a FinFET process. The OTP memory cell may include an anti-fuse device and a transistor. The transistor may be a FinFET and may be fabricated using the previously described example process for fabricating a FinFET. The anti-fuse device may include a first electrode, an insulating layer, and a second electrode and may also be fabricated using one or more same steps for fabricating the FinFET. For example, the first electrode of the anti-fuse device may be formed by the same metal layer that forms a gate of the FinFET. The second electrode of the anti-fuse device may be formed by the same metal layer used to form local interconnects (e.g., a first type of local interconnect). The insulating layer of the anti-fuse device may be formed by the same insulating layer used to insulate the gate in the FinFET such as a gate insulating layer.

The FinFET 308 may be formed with process steps previously described for the example process for fabricating a FinFET. For example, the fin 304 may be formed, the fin 304 may be isolated with STI oxide 332, and the gate 310, the source, and the drain may be formed using a gate-first or a gate-last process. In this embodiment, a gate-last process is used for forming the FinFET 308. Thus, the final gate 310 is formed after the source and the drain of the FinFET 308 is formed. In the gate-last process, a sacrificial gate stack is formed and patterned over the fin 304. The source and drain are formed by using the sacrificial gate stack as a hard mask during a doping step followed by a high temperature anneal. The gate spacer 334 is formed over the sacrificial gate stack and planarized using CMP. The sacrificial gate stack may be removed. The gate stack is formed by depositing the gate dielectric 336 and the gate 310 on the fin 304 after removal of the sacrificial gate. The gate spacer 334 not only isolates the gate but also defines the footprint of the gate 310 on the fin 304.

After formation of the FinFET 308, the FinFET 308 may be electrically insulated by with a gate insulating layer 346 and a first insulating layer 348a. The gate insulating layer 346 be an etch stop layer (e.g., silicon nitride). A first insulating layer 348a (e.g., $SiO_2$) may be formed on the gate insulating layer 346 as an inter-insulating layer. For some embodiments, there may not be a gate insulating layer 346 and only the first insulating layer 348a covering the gate 310. In other embodiments, there may be multiple insulating layers covering the gate 310.

Electrical connections may be made to the FinFET 308 by forming local interconnects 321b and 321c of a first type in the first insulating layer 348a. The local interconnects 321b and 321c may be formed by etching a hole the first insulating layer 348a and the gate spacer 334 down to the diffusion layer (e.g., the source or the drain of FinFET 308) and subsequently filling the hole with a conductive material such as metal. A second insulating layer 348b may be formed over the first insulating layer 348a and local interconnects 321, and a first metal layer (not shown) may be formed on top of second insulating layer 348b. Vias 322b and 322c may be made through the second insulating layer 348b to connect local interconnects 321b and 321c to a first metal layer. In some embodiments, one or more etch-stop layers may be included at different interfaces in the FinFET device.

The anti-fuse device 306 may include, among other structures, semiconductor substrate 330, shallow trench isolation (STI) oxide 332, gate spacer 334, first electrode 316 (made in same metal layer as gate 310), gate insulating layer 346, second electrode 320, first insulating layer 348a, and second insulating layer 348b. The process used to form the FinFET 308 may also be used to form the anti-fuse device 306. The anti-fuse device 306 may be formed on a region of the semiconductor substrate 330 not including fin 304.

The first electrode 316 of the anti-fuse device 306 may be formed on the STI oxide 332 used to isolate the fin 304. The first electrode 316 may be formed at a same time the gate 310 is formed in the FinFET 308. For example, during formation of the gate 310 on the fin 304, a first electrode 316 of the anti-fuse device 306 may be formed. The first electrode 316 and the gate 310 may be formed using a gate-first or a gate-last process. In this embodiment, a gate-last process is used to form the first electrode 316 and the gate 310 of the FinFET 308.

To form the first electrode 316 with a gate-last process, a sacrificial first electrode may first be formed at a same time a sacrificial gate stack is formed. The sacrificial first electrode may be removed at a same time the sacrificial gate stack is removed. The removal of the sacrificial first electrode may define the footprint of the first electrode, outlined by the gate spacer 334. The first electrode 316 may be formed on STI oxide 332 at a same time the gate 310 is formed on a gate dielectric 336. In one embodiment, the first electrode 316 of the anti-fuse device may be formed on a gate dielectric 336 formed on the STI oxide 332. Alternatively, as shown in FIG. 3B, the gate dielectric 336 may be formed only on the fin 304 and the first electrode 316 may be formed directly on the STI oxide 332.

The insulating layer of the anti-fuse device 306 may be formed in a same layer as a gate insulating layer 346 of the FinFET 308. The gate insulating layer 346 is formed on the gate 310 and is also formed on the first electrode 316. A first insulating layer 348a is above the gate insulating layer 346. Portions of the first insulating layer 348a may be removed to form the second electrode 320 of the anti-fuse device 306.

The second electrode 320 may be formed using the same process steps of forming the local interconnect 321b and 321c in the FinFET 308. The first insulating layer 348a may be an oxide material, and the gate insulating layer 346 may be a nitride material. The first insulating layer 348a may be etched by a first etch that preferentially etches the first insulating layer 348a and not the gate insulating layer 346 (e.g., contact to diffusion such as second electrode 320, local interconnect 321b and 321c). Thus, the first insulating layer 348a may be etched down to the surface of the gate insulating layer 346 with a first etch. The second electrode 320 may be formed by depositing and planarizing a metal layer in the trench formed in the first insulating layer 348a by the first etch.

In this embodiment, the anti-fuse insulating layer is the gate insulating layer 346. In another embodiment, only a portion of the first insulating layer 348a may be etched, and the insulating layer of the anti-fuse device may contain the first insulating layer 348a and the gate insulating layer 346.

After formation of the anti-fuse device 306, a second insulating layer 348b may be deposited over the second electrode 320 to electrically insulate the anti-fuse device 306 from a first metal layer (not shown). The first metal layer may cover the second insulating layer 348b Electrical connection to the anti-fuse device 306 may be made through local interconnect 321a, via 322a, and a first metal layer (not shown). To contact to the first electrode 316, the gate insulating layer 346 may be etched with a second etch that is different than the first etch (e.g., contact to gate such as local interconnect 321a). The local interconnect 321a may be formed by depositing and planarizing a metal layer in the hole formed in the first insulating layer 348a by the first etch and the gate insulating layer 346 by the second etch. A via 322a may be formed in the second insulating layer 348b by etching a hole in the second insulating layer 348b and filling the hole with metal. The local interconnect 321a connects the first electrode 316 to via 322a to contact a first metal layer (not shown) covering the second insulating layer 348b. The first metal layer may connect the first electrode 316 to a source or a drain of the FinFET 308.

Figure 3C:
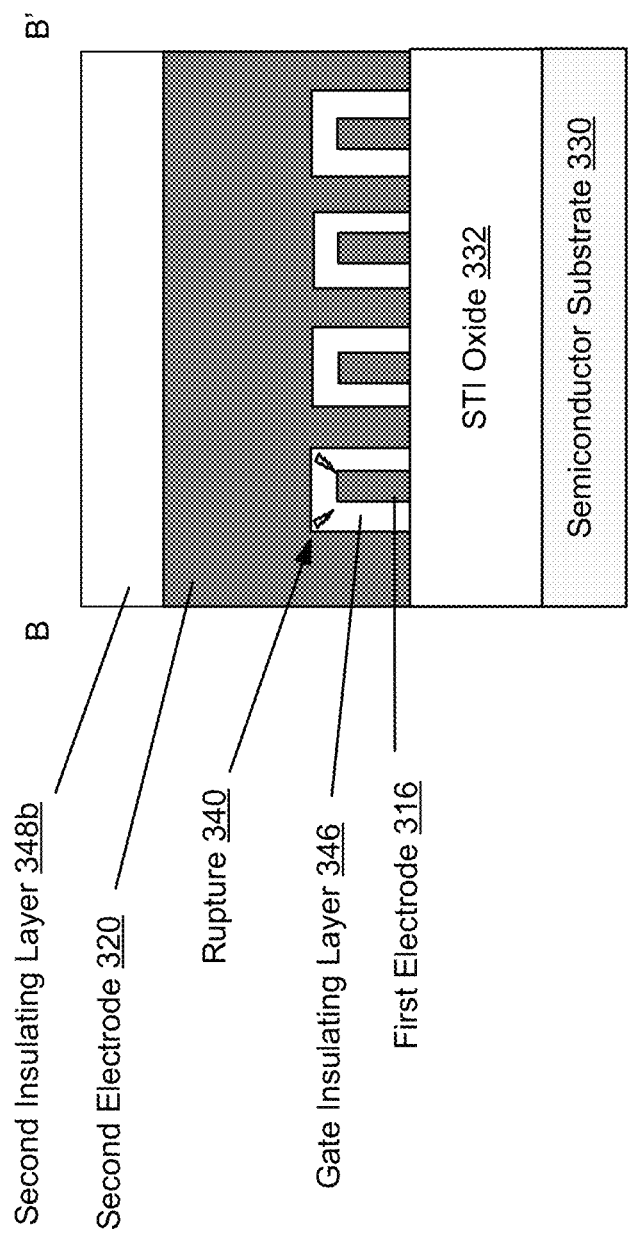
FIG. 3C is a cross sectional view of anti-fuse devices of the OTP memory cells taken along line B-B' of FIG. 3A, according to one embodiment.

FIG. 3C is a cross sectional view of anti-fuse devices 306 of the OTP memory cells taken along line B-B' of FIG. 3A, according to one embodiment. In this embodiment the second electrode 320 is made in a same process step as a first type of local interconnect (e.g., 321b and 321c) of a FinFET process to contact a diffusion layer which typically extends parallel and is self-aligned to the gate 310. However, the second electrode 320 formed in a same process step of the first type of local interconnect extends perpendicular to the first electrode 316 formed in a same process step of the gate 310.

When a voltage above a threshold is applied across the second electrode 320 and a first electrode 316, a rupture 340 may occur in the gate insulating layer 346 to create a current path from the first electrode 316 to the second electrode 320. Specifically, the rupture 340 may occur in the gate insulating layer 346 between corners of the first electrode 316 and the second electrode 320.

Figure 4A:
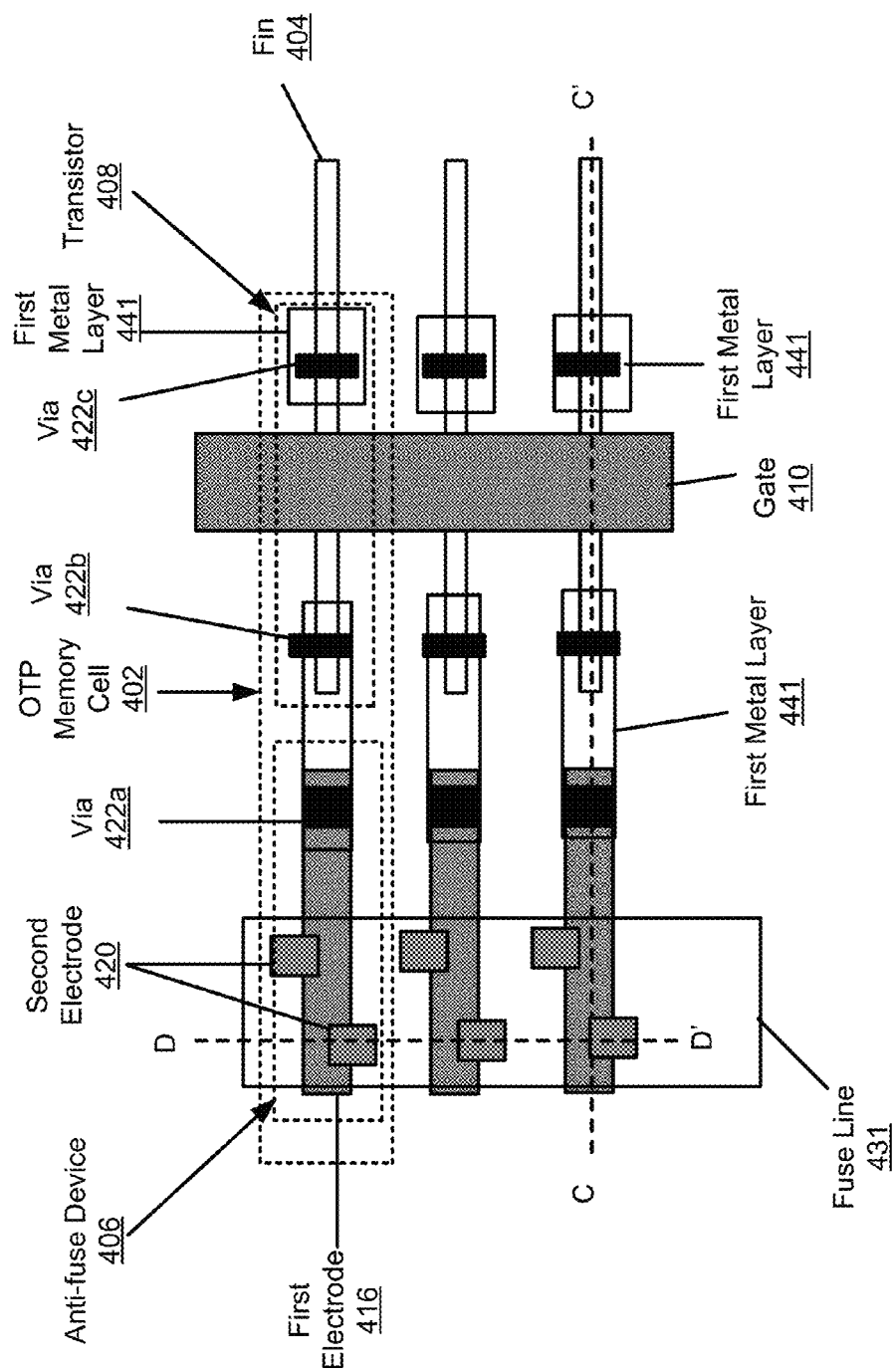
FIG. 4A is top view of OTP memory cells with an electrode of an anti-fuse device formed in a same layer as a local interconnect in a FinFET process in an alternate layout, according to one embodiment.

FIG. 4A is top view of OTP memory cells with an electrode 420 of an anti-fuse device 406 formed in a same layer as local interconnects 421b and 421c in a FinFET process in an alternative layout, according to one embodiment. The embodiment of FIG. 4A is similar to the embodiment shown in FIGS. 3A, 3B, and 3C except that the second electrode 420 is in the shape of a square, dot, or circle instead of a line. The first electrode 416 and the second electrode 420 may be misaligned as long as there is overlap between the first electrode 416 and the second electrode 420. Although not shown in FIG. 4A, a via 422d covers the second electrode 420. Additionally, FIG. 4A includes a fuse line 431 to connect the second electrode 420 of neighboring OTP memory cells.

The OTP memory cell 402 includes an anti-fuse device 406 and a transistor 408. The anti-fuse device 406 may include, among other structures, a first electrode 416, a second electrode 420, and a gate insulating layer 446 (shown in FIG. 4B) separating the first electrode 416 and the second electrode 420. The first electrode 416 is the same as the first electrode 316. The gate insulating layer 446 is the same as the gate insulating layer 346.

The second electrode 420 is similar to the second electrode 320, except that the second electrode 420 includes a first portion and a second portion that are shaped as squares or rounded squares or dots (e.g., similar to contacts) as a result of the photolithography process. It may be difficult to align a first and second portion of the second electrode 420 to overlap vertically to the first electrode 416. Hence, the spacing and layout between the first and second portion of the second electrode 420 may be determined such that the first electrode 416 and second electrode 420 overlap vertically, even with misalignment.

The transistor 408 (e.g., FinFET) may be used to write or to read the anti-fuse device 406 of the OTP memory cell 402. The transistor 408 may include, among other structures, a fin 404, a gate 410, and a source and a drain on the fin 404. The transistor 408 is the same as the transistor 308.

The electrical connections of the FinFET 408 to other circuit elements (e.g., anti-fuse device 406) may be made through vias 422, local interconnects 421, and first metal layer 441. Vias 422a, 422b, 422c is the same as via 322a, 322b, and 322c. Local interconnects 421a, 421b, 421c are the same as local interconnects 321a, 321b, 321c. A first metal layer 441 may be patterned to connect via 422a and via 422b, thus connecting the first electrode 416 to the drain or the source of transistor 408. As the second electrode 420 is shaped as a square, rounded square, or dot, the second electrode 420 is connected to a fuse line 431 through via 422d formed through the second insulating layer 448b. A fuse line 431 made in a same layer as the first metal layer 441 extends in a direction perpendicular to the first electrode 416. The fuse line 431 is connected to the second electrode 420 for each OTP memory cell.

Figure 4B:
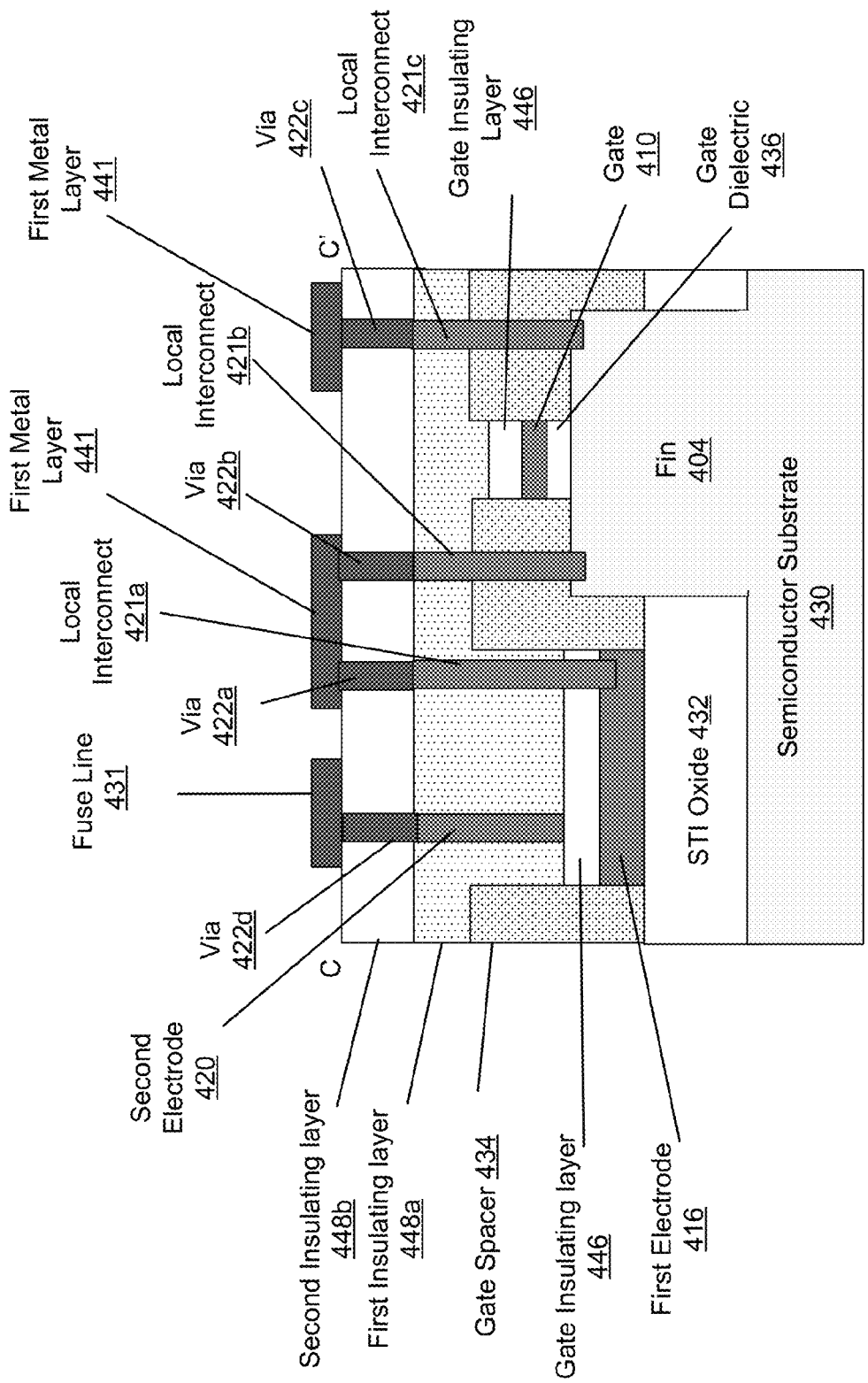
FIG. 4B is cross sectional view of a single OTP memory cell including an anti-fuse device and transistor taken along line C-C' of FIG. 4A, according to one embodiment.

FIG. 4B is cross sectional view of a single OTP memory cell including an anti-fuse device and transistor taken along line C-C' of FIG. 4A, according to one embodiment. In FIG. 4B, an anti-fuse device 406 is shown on the left side and the FinFET 408 is shown on the right side.

The cross sectional view of the FinFET 408 may include, among other structures, semiconductor substrate 430, a fin 404, shallow trench isolation (STI) oxide 432, gate spacer 434, gate dielectric 436, gate 410, gate insulating layer 446, first insulating layer 448a, and second insulating layer 448b. The anti-fuse device 406 includes semiconductor substrate 430, STI oxide 432, gate spacer 434, first electrode 416 (made in same metal layer as gate 410), gate insulating layer 446, second electrode 420, first insulating layer 448a, and second insulating layer 448b. These components are similar to the corresponding components described for FIG. 3B and a description is omitted for the sake of brevity. Additionally, a via 422d through the second insulating layer 448b connects a metal fuse line 431 in a first metal layer 441 to the second electrode 420.

Figure 4C:
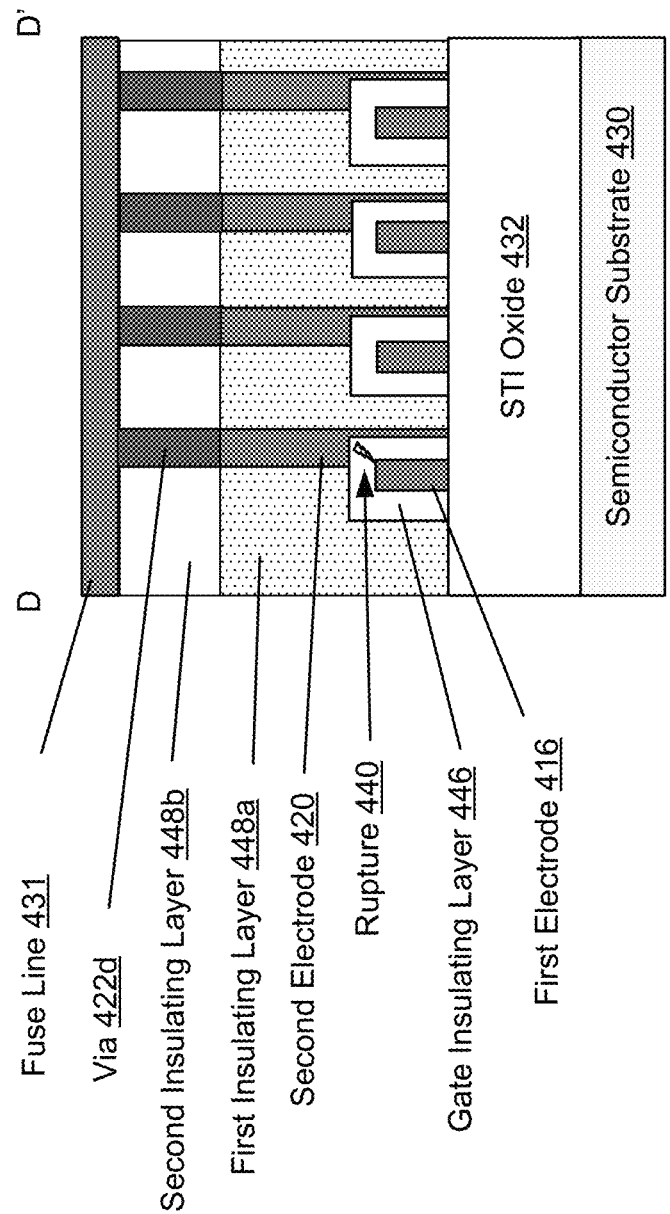
FIG. 4C is cross sectional view of anti-fuse devices of the OTP memory cells taken along line D-D' of FIG. 4A, according to one embodiment.

FIG. 4C is a cross sectional view of anti-fuse devices of the OTP memory cells taken along line D-D' of FIG. 4A, according to one embodiment. In this embodiment, the second electrode 420 is formed by etching the first insulating layer 448a to the gate insulating layer 446. When a voltage above a threshold is applied across the second electrode 420 and a first electrode 416, a rupture 440 may occur in the gate insulating layer 446 to create a current path from the first electrode 416 to the second electrode 420. Specifically, the rupture 440 may occur in the gate insulating layer 446 between a corner of the first electrode 416 and the second electrode 420.

Figure 5:
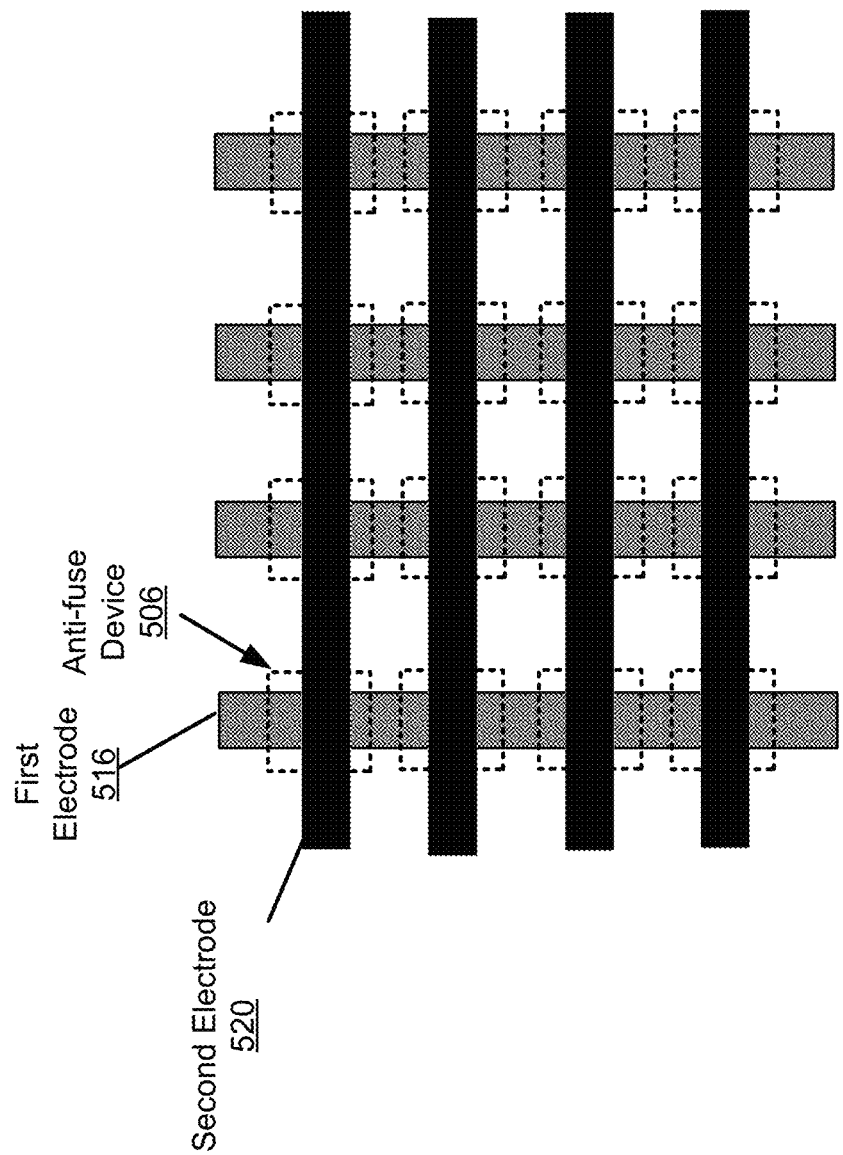
FIG. 5 is a top view of a cross point array forming a plurality of anti-fuse devices, according to one embodiment.

FIG. 5 is a top view of a cross point array forming a plurality of anti-fuse devices 506, according to one embodiment. The cross point array includes first electrodes 516 extending in a first direction and second electrodes (e.g., local interconnects) 520 extending in a second direction that is perpendicular to the first direction. A gate insulating layer (not shown) separates the first electrodes 516 and second electrodes 520. A cross point array is functionally used for different purposes than a memory array. For example, a cross point array can be used for routing signals rather than storing information in memory. The main difference between a memory array and a cross point array is the cross point array does not have a select device.

The first electrodes 516 may be formed in the same layer as a gate layer for a transistor used to address the OTP memory cell. The cross point array includes anti-fuse devices at the intersection of each electrode and local interconnect. Each anti-fuse device can be written by applying a voltage across a corresponding first electrode and second electrode to rupture the gate insulating layer between the corresponding electrode and local interconnect. The cross point array could be used as a cross point memory with each anti-fuse device in the cross point array being a bit cell.

In one embodiment, an OTP memory cell may be fabricated following layout restrictions for a FinFET process. Such layout restrictions may include, among others, (i) all diffusion lines (e.g., fins) to run in one direction, (ii) all gates to run in a direction perpendicular to the diffusion lines, and (iii) all gate and diffusion lines have a regular spacing.

Figure 6:
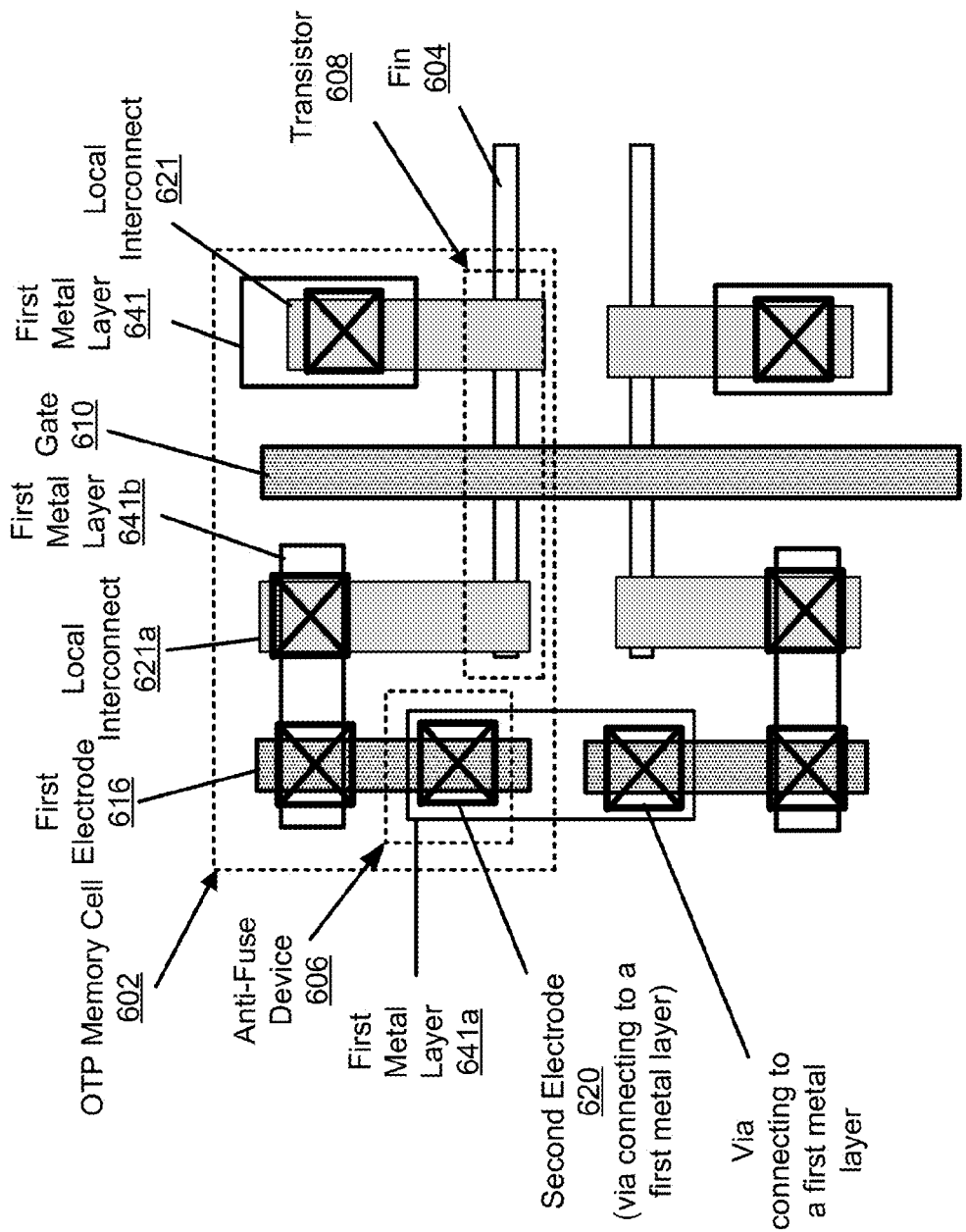
FIG. 6 is a top view of OTP memory cells in which a gate and a first electrode extend in a direction parallel to each other and are formed using a FinFET process, according to one embodiment.

FIG. 6 is a top view of OTP memory cells in which a gate 610 and a first electrode 616 extend in a direction parallel to each other formed using a FinFET process, according to one embodiment. In this embodiment, the second electrode 620 of the anti-fuse device 606 is a via that connects to a first metal layer 641a. Previous embodiments have a second electrode 620 made in a same layer as a diffusion local interconnect. In contrast, the second electrode 620 in this embodiment is a via made on top of a gate insulating layer on top of the first electrode, and a diffusion local interconnect is not used in forming the second electrode. The second electrode 620 is aligned to overlap vertically to the first electrode 416. Additionally, the first electrode 616, gate 610, and local interconnect 621 lines are formed parallel to each other.

The OTP memory cell 602 includes an anti-fuse device 606 with a transistor 608. The transistor 608 is the same as the transistor 408 and the transistor 308. The anti-fuse device 606 includes a first electrode 616, a second electrode 620, and a gate insulating layer (not shown) separating the first electrode 616 and the second electrode 620. The first electrode 616 is the same as the first electrode 416 and the first electrode 316. The gate insulating layer is the same as the gate insulating layer 446 and 346. The second electrode 620 is similar to the second electrode 420 except the second electrode 620 is a single square shape and may become circles or dots during the manufacturing process (e.g., photolithographic process may round the corners of the square shape) and is aligned to overlap the first electrode 616 over the gate insulating layer. The second electrode 620 is a via that is used to connect the first layer of metal 641a to the two types of local interconnect layers. An anti-fuse is formed by placing a via located in a position where neither type of local interconnect layer exists. For purposes of clarity, the vias that connect to a first metal layer 641 are shown in FIG. 6. The second electrode 620 is made in a same layer as a via that is made to connect a first metal layer to a local interconnect. However, because no local interconnect exists, the via is formed over the first electrode 616 separated by at least a gate insulating layer, forming an anti-fuse device. In one embodiment, the second electrode 620 may be separated from the first electrode 616 by a gate insulating layer and a first insulating layer.

Electrical connections are formed between the transistor 608 and the anti-fuse device 606 through the local interconnect 621 and the first metal layer 641. The electrical connection made from the anti-fuse device 606 to the transistor 608 may be different than previous embodiments. The first electrode 616 may be connected through a first metal layer 641b extending horizontally to a local interconnect 621a extending vertically to a source or a drain of transistor 608. Thus, the first electrode 616 may be connected to the source or the drain of the transistor 608.

In previous embodiments such as FIG. 4A, a fuse line 431 may be made in the first metal layer 441 in a vertical direction to connect the second electrode 420 of neighboring anti-fuse device 406 because the first electrode 416 extends in a horizontal direction (perpendicular to the gate 410) and contacts to the first electrode 416 could be made in another portion of first electrode 416 the anti-fuse device 406 adjacent to the vertical portion of a fuse line 431.

However, in this embodiment, the first electrode 616 runs parallel to the gate 610 and extends in a vertical direction. If a fuse line were formed in a vertical direction in a first metal layer 641, the connection of the first electrode 616 to a source or a drain of transistor 608 could not be made in the first metal layer 641. Thus, the first metal layer 641a may be patterned to connect the second electrode 620 of an anti-fuse device 606 to a neighboring anti-fuse device. A second metal layer fuse line may be formed in a vertical direction to contact the first metal layer 641a and connect neighboring second electrodes 620.

Upon reading this disclosure, a reader will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein.

What is claimed is:

1. An anti-fuse device for an integrated device manufactured using a Field Effect Transistor (FET) process comprising:

a first electrode made in a same layer as a gate of a transistor made with the FET process;

a gate insulating layer covering a first part of the first electrode and the gate of the transistor made with the FET process; and a second electrode at least partially overlapping the first part of the first electrode, a portion of the gate insulating layer between the second electrode and the first electrode shorted to create a current path between the first electrode and the second electrode responsive to applying a voltage above a threshold across the gate insulating layer.

2. The anti-fuse device of claim 1, wherein the second electrode is a local interconnect or a via, the local interconnect or the via being formed in a same layer as a layer that electrically connects a first metal layer to a diffusion layer.

3. The anti-fuse device of claim 1, wherein the first electrode extends in a first direction and the second electrode is a local interconnect that extends in a second direction forming an angle with the first direction.

4. The anti-fuse device of claim 3, wherein the angle is 90 degrees.

5. The anti-fuse device of claim 1, further comprising:
the transistor comprising the gate, the gate formed in a same layer as the first electrode; and
the gate insulating layer on the gate of the transistor, the gate insulating layer covering at least part of the gate.

6. The anti-fuse device of claim 5, wherein the transistor is a FinFET.

7. The anti-fuse device of claim 5, wherein the first electrode is electrically connected to a source or a drain of the transistor.

8. The anti-fuse device of claim 7, wherein the first electrode and the second electrode are shorted responsive to applying the first voltage to the second electrode and grounding the first electrode.

9. The anti-fuse device of claim 1, wherein the second electrode is in a shape of a square or a dot.

10. The anti-fuse device of claim 1, wherein the second electrode comprises a first portion and a second portion configured to overlap vertically with the first electrode.

11. The anti-fuse device of claim 10, wherein the first portion is offset from the second portion to overlap at least partially with the first electrode even if misalignment occurs when forming the second electrode.

12. A non-transitory computer-readable storage medium storing design of a circuit, the circuit comprising an anti-fuse device for an integrated device manufactured using a Field Effect Transistor (FET) process comprising:

a first electrode made in a same layer as a gate of a transistor made with the FET process;

a gate insulating layer covering a first part of the first electrode and the gate of the transistor made with the FET process; and a second electrode at least partially overlapping the first part of the first electrode, a portion of the gate insulating layer between the second electrode and the first electrode shorted to create a current path between the first electrode and the second electrode responsive to applying a voltage above a threshold across the gate insulating layer.

13. The non-transitory computer-readable storage medium of claim 12, wherein the second electrode is a local interconnect or a via, the local interconnect or the via being formed in a same layer as a layer that electrically connects a first metal layer to a diffusion layer.

14. The non-transitory computer-readable storage medium of claim 12, wherein the first electrode extends in a first direction and the second electrode is a local interconnect that extends in a second direction forming an angle with the first direction.

15. The non-transitory computer-readable storage medium of claim 14, wherein the angle is 90 degrees.

16. The non-transitory computer-readable storage medium of claim 14, the anti-fuse device further comprising:
the transistor comprising the gate, the gate formed in a same layer as the first electrode; and
the gate insulating layer on the gate of the transistor, the gate insulating layer covering at least part of the gate.

17. The non-transitory computer-readable storage medium of claim 16, wherein the first electrode is electrically connected to a source or a drain of the transistor.

18. The non-transitory computer-readable storage medium of claim 17, wherein the first electrode and the second electrode are shorted responsive to applying a first voltage to the second electrode and grounding the first electrode.

* * * * *

UNITED STATES PATENT AND TRADEMARK OFFICE
CERTIFICATE OF CORRECTION

PATENT NO. : 9,953,990 B1
APPLICATION NO. : 15/666445
DATED : April 24, 2018
INVENTOR(S) : Andrew E. Horch, Victor Moroz and Jamil Kawa Page 1 of 1

It is certified that error appears in the above-identified patent and that said Letters Patent is hereby corrected as shown below:

Claim 8, Column 15, Line 35, delete "applying the first voltage" and insert --applying the voltage--.

Claim 18, Column 16, Line 42-43, delete "applying a first voltage" and insert --applying the voltage--.

Signed and Sealed this
Twenty-fifth Day of September, 2018

Andrei Iancu
*Director of the United States Patent and Trademark Office*